April 12, 1966    K. W. ANDERSON ETAL    3,246,116
PROCESS FOR MAKING FINNED TUBES
Filed Dec. 31, 1962    2 Sheets-Sheet 2
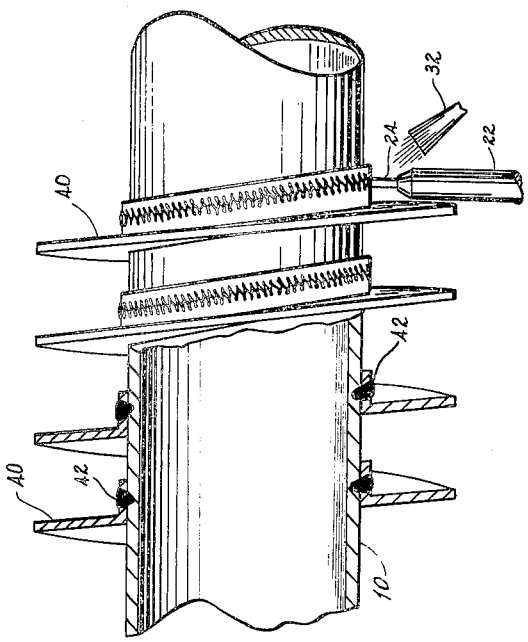
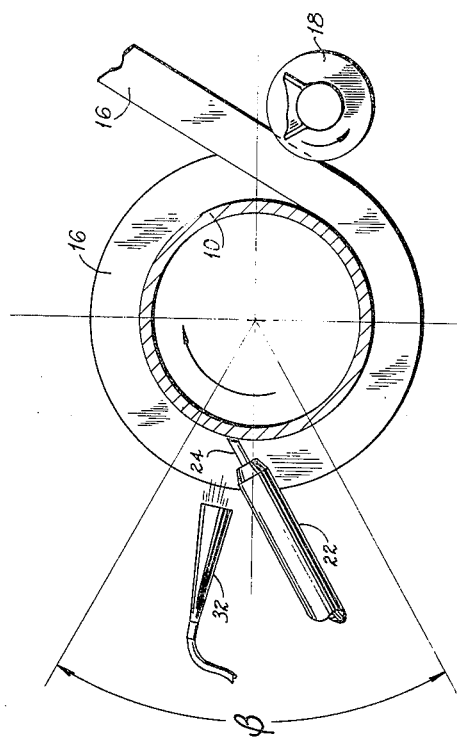
INVENTORS
KENNETH W. ANDERSON
VERNON C. CANTER
BY
*Head & Johnson*
ATTORNEYS _United States Patent Office_

3,246,116
Patented Apr. 12, 1966

3,246,116
PROCESS FOR MAKING FINNED TUBES
Kenneth W. Anderson and Vernon C. Canter, Tulsa, Okla., assignors to Kentube Company, Tulsa, Okla., a corporation of Oklahoma
Filed Dec. 31, 1962, Ser. No. 248,598
5 Claims. (Cl. 219—124)

This invention relates to methods and apparatus for forming finned heat transfer tubes. More specifically, this invention relates to a helically wound finned tube and methods and apparatus for continuously welding the fin to the tube.

The continuous welding of metal strips on edge with respect to a curved surface, such as cylindrical tubing, has been heretofore performed by a variety of methods, using a variety of apparatus, many of which do not provide adequate heat transferability because of improper union of the metal strip and the curved or cylindrical surface. Additionally, in heavier duty heat transfer equipment such as boilers, process heaters, and waste heat exchangers, high strength fins and tubing is required. Accordingly, the problems in coiling and helically winding relatively thicker strips of metal about a cylindrical tube and causing a proper juncture between the fin or strip and the curved surface are multiplied.

Accordingly, it is a primary object of this invention to overcome the problems encountered with prior heavy duty finned heat transfer tube forming processes.

Another object of this invention is to provide a method of continuously welding helically wound extended surfaces upon curved surfaces which are rotating and moving in one axial direction.

A further object of this invention is to provide a method for continuously welding extended finned surfaces to rotating and axially moving tubing using an automatic gas shielded electric arc process wherein filler wire is continuously fed to the juncture of the extended surface and the tubing.

A yet further object of this invention is to provide a method of attaching the relatively horizontal leg of L-shaped extended surfaces or fins to a rotating and axially moving tubing using an automatic gas shielding electric arc process while continuously feeding a filler wire atop the leg to cause a juncture between the leg and the rotating tubing.

A yet further object of this invention is to provide a method of welding extended surfaces or fins to rotating and axially moving tubing using an automatic gas shielded electric arc process and continuously welding with filler wire the juncture between said extended surface and tubing and performing the process at speeds heretofore unobtainable.

These and other objects of this invention will become more apparent upon further reading of the description and claims taken in conjunction with the following illustrations, of which:

FIGURE 2 is a sectional view taken along the line 2—2 of FIGURE 1.

FIGURE 3 is an elevational view partly in cross-section of an additional embodiment incorporating the methods of this invention.

GENERAL DESCRIPTION

Figure 1:
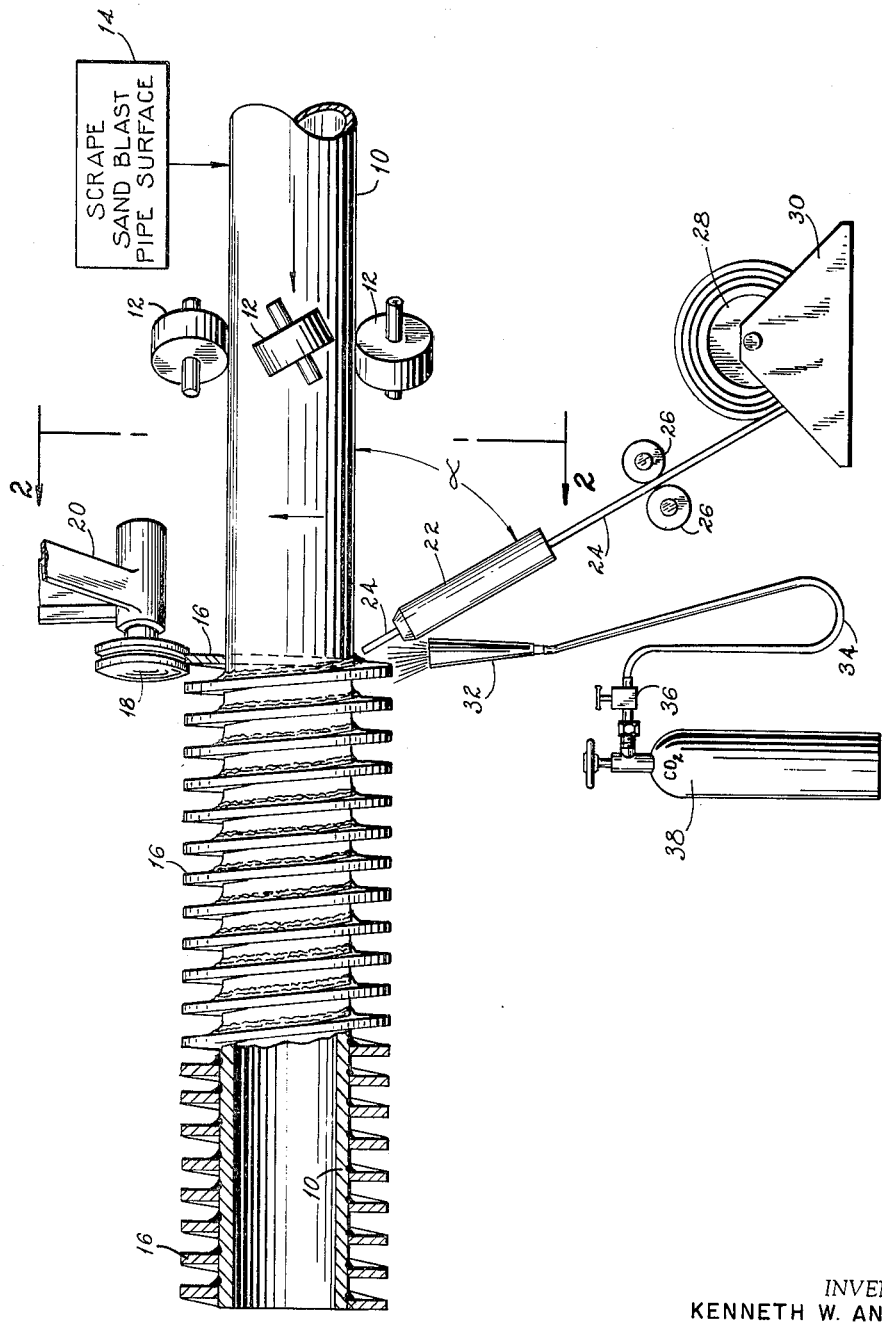
FIGURE 1 is a partial sectional, partial diagrammatic top elevational view of the method of this invention.

Basically, this invention is concerned with a method of forming finned heat transfer surfaces by attaching substantially transverse or extended surfaces to an axially rotating and longitudinally moving tubing by an automatic gas shielded electric arc process forming a continuous weld bead interconnecting the tubing and the extended surface at the juncture thereof. This process is accomplished at peripheral surface speeds within the range of 20 to 80 feet per minute. The invention is extended to include a process for attaching L-shaped extended surfaces to a rotating and axially moving curved surface, wherein the foot of the L-shaped extended surface is contiguous to the surface and wherein the continuous weld bead process is caused to form between the mating surfaces.

DETAILED DESCRIPTION

Referring now to FIGURE 1 in particular, the process of this invention is best described. The curved surface of this invention is depicted, as is the usual case, by a longitudinal length of tubing 10. The tubing is pre-cut into specific predetermined lengths or can be cut to desired lengths after the fin forming process.

The tubing is rotated and moved longitudinally by a drive system schematically depicted here as a multiplicity of guide rollers 12 which are skewable to the desired rotative and longitudinally advancing speed. Although the drive mechanism is schematically illustrated, it is understood that there are many various manners for rotating and longitudinally advancing tubing 10.

It is preferred in the operation of this invention that the exterior surface of tubing 10 be cleaned of scale and dirt. Hence, as indicated in the drawing, well known scraping, grinding and/or sand blasting processes 14 clean the exterior of the tubing 10.

A ribbon like stock or strip of the extended surface or fin 16 is advanced from a reel, not shown, to a position contiguous with the rotating and axially moving tubing 10. The strip is advanced to a position such that the strip is in a plane substantially transverse to the axis of the tubing 10. By means of a pressure guide roller 18, which is relatively affixed with respect to the tubing by a support mechanism 20, the strip is caused to coil by a cold rolling process about the tubing 10 and thereby form a helical coil of a pitch dependent upon the rotative and longitudinal axial moving speeds.

On the upwardly moving side of the rotating and advancing tubing is affixed, contiguous to the junction of the fin 16 and the tubing 10, an arc welding electrode holder 22 through which is fed a wire electrode 24 which is continuously fed by feed rolls 26 from a reel 28 supported upon a bracket 30. The electrode 24 is so positioned with respect to the juncture of the strip 16 and the tubing 10 such that a continuous uniform fillet weld bead is formed joining the tubing and the fin 16. Typically, the source of welding current is a direct current welding generator with the negative terminal of the generator connected to the workpiece and the positive terminal to the wire electrode, all of which is well known to those skilled in the welding arts and is not shown in the drawing. The welding process includes consumable and non-consumable arc welding processes.

It has been found that the welding process for use in this invention preferably requires an inert gas shroud or blanket about the arc to prevent rapid oxidation of the weld bead. Therefore, closely adjacent the arc formed by the electrode 24, is located a nozzle or tubing 32 which connects with inert gas supply line 34 and reducing valve 36 which connects with a cylinder 38 of carbon dioxide ($CO_2$) gas, or any of the inert gases such as argon or helium which shield the arc from rapid oxidation.

Although the particular angle of incidence alpha ($\alpha$) of the electrode with respect to the axis of the tubing is not of any particular critical importance, it is preferred that the electrode bisect the angle formed between the fin and the tubing.

Referring now to FIGURE 2, an important phase of this invention is described. It has been found that for peripheral tubing speeds within the range of 20 to 80 feet per minute while axial movement is within the range of 1/10 to 10 feet per minute the position of the electrode 24 in the vertical plane with respect to the juncture of the fin 16 and the tubing 10 is critical in forming a continuous weld bead. It has been found, depending upon the peripheral and longitudinal movable speeds, that the electrode be positioned within the work angle beta ($\beta$) on the upwardly moving side between the range of 0° and 30° with respect to the horizontal axis. That is, beta is equal to substantially 60°, 30° above and 30° below the horizontal axis. It is further critical that the placement of the electrode be such to maintain a molten metal riverlet or droplet, which is deposited by the electrode, at a point slightly above the position of the arc. At any other angular position outside the range of beta it has been found that the molten metal will not remain as a droplet or riverlet, at the peripheral speed within the range of this invention, because of centrifugal and gravitational forces.

Referring now to FIGURE 3, an alternate embodiment of this invention is described. In this embodiment an L-shaped extended surface or fin 40 is pre-formed and cold rolled about the tubing 10 such that the horizontal leg of the fin is in surface contact with the tubing. The gas arc electrode is positioned atop the surface of the relatively horizontal leg and acts to form a juncture 42 of the electrode, the fin and the tubing. In this embodiment it has been found that less undercutting to the pipe occurs when the electrode 24 is angularly positioned ($\alpha$) contiguous to the top surface of the relatively horizontal leg of the L-shaped fin, at 90°. The work angle beta remains the same.

As a typical example of this invention 18 gage steel fin stock was adapted to be cold rolled and helically wound upon 4½" O.D. steel tubing. The tubing was rotated at a peripheral speed of 41 feet per minute and advanced axially at the rate of 1 foot for each 48 revolutions. A carbon steel-copper coated welding electrode wire was positioned at an angle ($\alpha$) of approximately 45° while the work angle ($\beta$) was set slightly above the horizontal axis or about 5°. A carbon dioxide ($CO_2$) gas envelope was continuously formed about the arc during the process.

Although a relatively straight or smooth fin stock 16 and L-shaped stock 40 have been particularly described it is to be understood that fin stock having serrated or crimped outer edges or fin stock of other configuration is capable of use with this invention. Nor is the invention limited to round tubing as oval, square or rectangular shapes are adaptable to the process.

Although this invention has been described with a certain degree of particularity, this is not to be held limiting as other forms and modifications of the process of this invention may be had without departing from the spirit and scope of this invention as set forth in the claims.

What is claimed:
1. A method of attaching transverse helical extended surfaces onto a rotating and longitudinally moving member, comprising the steps:
   positioning a gas shielded arc welding electrode substantially at the juncture of said surface and said member along the upwardly moving side at an angle with respect to the horizontal plane of said member within the range of 0° and 30°; and
   rotating said member at a peripheral surface speed sufficient to maintain a molten metal riverlet deposited by said electrode at a point slightly above the arc position.
2. A method of forming finned heat transfer tubing comprising the steps of:
   simultaneously rotating and axially moving said tubing;
   coiling a constant cross-section solid fin stock about the exterior of said tubing such that said stock extends substantially transverse to the axis of said tubing;
   positioning a gas shielded arc welding electrode substantially at a juncture point of said surface and said member along the upwardly moving side, said point located within an angle defined by 30° either side of the transverse horizontal axis of said tubing; and
   operating said welding electrode whereby a continuous weld bead is formed at said juncture.
3. A method of forming finned heat transfer tubing comprising the steps of:
   simultaneously unidirectionally rotating and unidirectionally axially moving said tubing;
   coiling a constant cross-section solid fin stock about the exterior of said tubing such that said stock extends substantially transverse to the axis of said tubing;
   positioning a gas shielded arc welding electrode substantially at a juncture point of said surface and said member along the upwardly moving side, said point located within an angle defined by 30° either side of the transverse horizontal axis of said tubing;
   activating said arc welding electrode; and
   said rotating and axially moving speed adjusted such that a molten metal riverlet deposited by said electrode is maintained at a point slightly above said juncture point.
4. Apparatus for forming exteriorly finned heat transfer tubing comprising:
   means to clean the exterior of said tubing;
   means to simultaneously rotate and axially move said tubing;
   means to helically coil fin stock about said exterior of said tubing to extend substantially transverse to the axis of said tubing;
   a consumable arc welding electrode positionable at a juncture point of said stock and said tubing exterior along the upwardly moving side;
   means to strike said arc and continuously feed said electrode; and
   means to envelope said arc with a non-oxidizing gas.
5. A method of forming finned heat transfer tubing comprising the steps of:
   simultaneously rotating and axially moving said tubing;
   helically coiling an L-shaped fin stock about the exterior of said tubing in such a manner that the horizontal leg abuts the exterior of said tubing while said vertical leg extends substantially transverse to the axis of said tubing;
   positioning a gas shielded arc welding electrode substantially at a point adjacent the top of said horizontal leg along the upwardly moving side, said point located within an angle defined by 30° either side of the transverse horizontal axis of said tubing;
   striking the arc of said electrode; and
   setting said rotating and axially moving speed such that a molten metal riverlet deposited by said electrode is maintained at a point slightly above said point, whereby a continuous weld junction of said horizontal leg and said tubing is formed.

References Cited by the Examiner

UNITED STATES PATENTS

| | | | |
|---|---|---|---|
| 1,834,736 | 12/1931 | Purdy | 219—137 |
| 2,107,831 | 2/1938 | Morseth | 219—107 |
| 2,827,551 | 3/1958 | Orr et al. | 219—137 |
| 2,874,263 | 2/1959 | Williams et al. | 219—61 |
| 2,909,649 | 10/1959 | Landis et al. | 219—137 |

RICHARD M. WOOD, *Primary Examiner.*

JOSEPH V. TRUHE, *Examiner.*